United States Patent [19]

Tanaka

[11] Patent Number: 4,710,007
[45] Date of Patent: Dec. 1, 1987

[54] CAMERA SYSTEM WITH LENS COUPLING MEMBER

[75] Inventor: Kazuo Tanaka, Tokyo, Japan

[73] Assignee: Canon Kabushiki Kaisha, Tokyo, Japan

[21] Appl. No.: 757,612

[22] Filed: Jul. 22, 1985

[30] Foreign Application Priority Data

Jul. 23, 1984 [JP] Japan .................. 59-152523

[51] Int. Cl.$^4$ ............................. G03B 17/00
[52] U.S. Cl. ................................. 354/286
[58] Field of Search ............ 354/286, 270, 271.1, 354/454, 455; 358/224, 225, 228, 229

[56] References Cited

U.S. PATENT DOCUMENTS

| 2,890,641 | 6/1959 | Field | 354/286 X |
|---|---|---|---|
| 3,224,327 | 12/1965 | Schulze | 354/270 X |
| 3,968,504 | 7/1976 | Komine | 354/286 X |
| 4,030,825 | 6/1977 | Ghougasian | 354/270 X |
| 4,325,621 | 4/1982 | Iwata et al. | 354/286 X |
| 4,518,239 | 5/1985 | Tomori | 354/286 |

FOREIGN PATENT DOCUMENTS

| 767287 | 4/1952 | Fed. Rep. of Germany | 354/286 |
|---|---|---|---|
| 22636 | 10/1963 | Japan | 354/286 |

Primary Examiner—Donald A. Griffin
Attorney, Agent, or Firm—Toren, McGeady & Associates

[57] ABSTRACT

In the disclosed system, a coupler adapts a large formal lens, such as for a 35 mm camera, to a small format camera, such as a video camera, with an apertured light obstructing member that blocks off axial rays outside the small format image frame and partially blocks off axial rays within the small format image frame.

8 Claims, 8 Drawing Figures

4,710,007

CAMERA SYSTEM WITH LENS COUPLING MEMBER

BACKGROUND OF THE INVENTION

This invention relates to camera systems, such as video camera systems with a lens coupling member, and more particularly to a lens coupling member which allows various photographic lenses to be interchangeably attached to a camera body.

In the past, camera bodies have operated with interchangeable fixed focal length lenses and zoom lenses to accomplish various photographic ends. To allow this, a mechanism on the camera body secures the lenses to the body.

Recently available photographic cameras may be classified as 35 mm cameras using photographic film, video cameras, 8 mm cameras, and others. These categories have respective individual photographic lenses designed and constructed in accordance with the image format of the camera.

However, it is possible to use photographic lenses of one camera category with cameras of another, for example, 35 mm cameras with video cameras. In other words, it is possible to utilize the photographic lens constructed for one image format with a camera body of a different image format.

However, to do this one need take into account the image circle of the lens. For example, in a video camera using a ⅔ inch image pickup tube, the diameter of the image circle is at least 11 mm, while in the 35 mm camera, it is at least 43.3 mm. Therefore, using photographic lenses for video camera on 35 mm cameras will very likely eclipse or shade the corners of the picture frame. Hence, satisfactory imaging performance cannot be insured over the entire area of the picture frame.

Conversely, when the photographic lenses for the 35 mm camera are mounted on video cameras, there is no possibility of eclipse, and no problem in respect to the image quality over the entire area of the frame.

In fact, generally speaking, photographic lenses primarily adapted for a large format, (i.e., large format lenses), for example for silver halide film cameras (i.e., large format cameras) can be used in place of lenses primarily adapted to a smaller format (i.e., small format lenses), for example, for video cameras (i.e., small format cameras).

However, with a large format photographic lens on a small format camera body, pencils of light rays enter the camera body and strike areas outside of the image frame. This introduces flare and ghost and lowers the image quality at the margin of the image frame because more than the necessary pencils of light rays arrive at the margin, and the light distribution becomes nonuniform over the entire area of the frame.

An object of the invention is to improve camera systems.

Another object of the invention is to avoid the aforementioned disadvantages.

Yet another object of the present invention is to provide a lens coupling member for use in attaching a large format photographic lens to a small format camera body which prevents unnecessary pencils of light rays from entering the camera body, and thereby to eliminate the aforementioned drawbacks.

SUMMARY OF THE INVENTION

To achieve these ends, according to a feature of the invention a lens coupler for attaching the lens to the camera body includes a light obstructing member for limiting pencils of light rays entering the camera body from the photographic lens.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
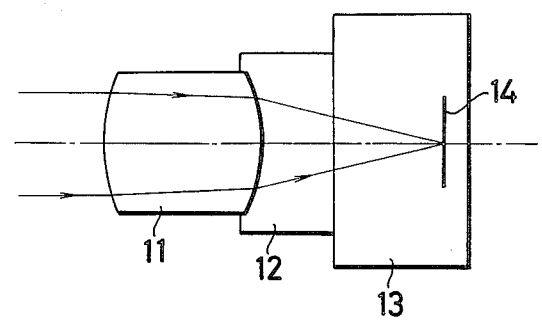
FIGS. 1 and 2 are schematic diagrams of an optical system embodying the invention.

FIG. 1 schematically illustrates a camera system embodying the invention, in which a coupler couples a photographic lens to a camera body. FIG. 1 includes a photographic lens 11, a lens coupling member 12, having a light obstructing member, and a camera body 13 having an image plane 14.

Figure 2:
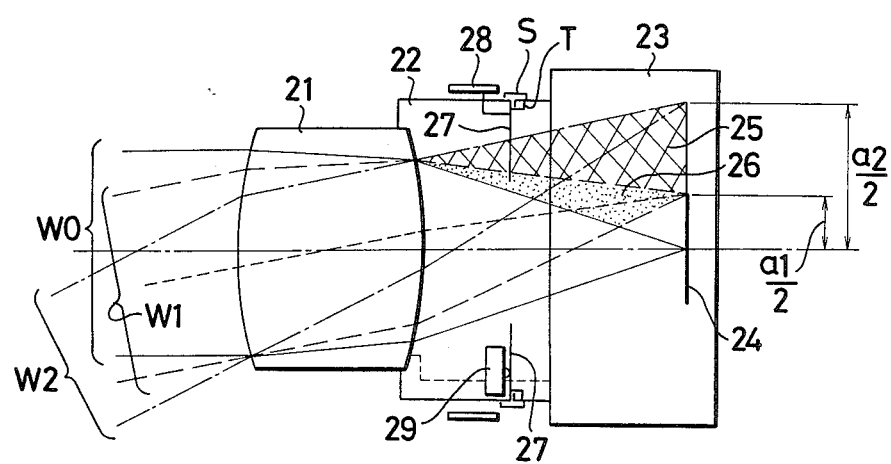

FIG. 2 shows which pencils of light rays, traveling from the lens to the camera body are obstructed when a lens coupling member such as that of FIG. 1 is used. In FIG. 2, a large format photographic lens 21 is primarily constructed to furnish an effective image frame size, $a_2$. A lens coupling member 22 corresponding to the member 12 of FIG. 1, between the photographic lens 21 and the camera body 23 incorporates a light obstructing member 27. A small format camera body 23 contains an image pickup having a smaller effective image frame size, $a_1$. An on-axis pencil of light rays is denoted by $w_0$. An oblique pencil of light rays $w_1$ strikes and corresponds to the extra-axial or off-axis image point in the frame of the image pickup 24. Another oblique pencil of light rays $w_2$ corresponds to an extra-axial or off-axis image point of the larger frame for which the large format lens 21 is constructed but is regarded as unnecessary for the smaller image pickup 24 of the small format camera 23.

A light obstructing member 27 is formed in a portion of the lens coupling member 22 and has an aperture dimensioned to obstruct part of the first oblique pencil $w_1$ and all the second oblique pencil $w_2$, while admitting the on-axis pencil $w_o$. Without influencing the speed of the photographic lens 21 or the F-number, the light obstructing member 27 prevents transmission of the unnecessary pencil into the interior of the camera body. This removes the flare and ghost which would otherwise be introduced by multiple reflections of the unnecessary pencil from the interior surfaces of the camera body, and provides an improvement in the optical performance by obstructing part of the oblique pencil $w_1$.

Figure 3A:
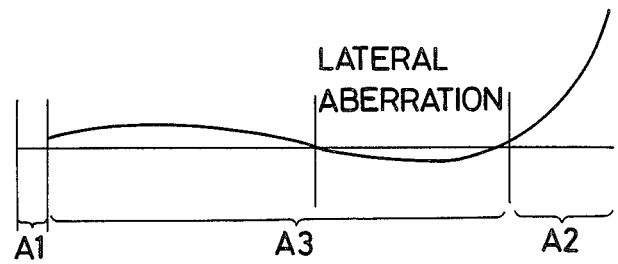
FIGS. 3(a) and 3(b) are graphic representations of aberrations of the prior art and of devices embodying the invention.
Figure 3B:
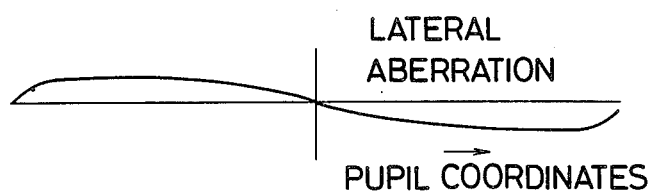

FIGS. 3(a) and 3(b) graphically illustrate the improvement of the optical performance achieved by using the light obstructing member 27 when the oblique pencil $w_1$ corresponding to the extra-axial image point of the image pickup area 27 is partly obstructed as shown in FIG. 2.

The aberrations of FIG. 3(a) are most generally seen in photographic lenses which admit all the oblique pencil $w_1$ of FIG. 2. The oblique pencil $w_1$ has its lower marginal portion $A_1$ mutilated by the edge of the front member of the photographic lens, and its upper marginal portion $A_2$ transmitted to the corners of the image pickup frame 24 with formation of coma.

When the upper marginal portion of the oblique pencil $w_1$ is obstructed by the member 27, only that portion of the pencil which substantially corresponds to a region $A_3$ is transmitted within the boundry of the image pickup frame. This removes the comatic aberration and the improved aberration is shown in FIG. 3(b).

It will be appreciated that, in view of the fact that photographic lenses generally admit all the oblique pencil $w_1$ whose upper marginal portion contributes to large aberrations, the use of the obstructing member 27 of the invention provides the possibility of achieving an improvement of the image aberrations. This is done by removing those off-axis aberrations and particularly coma which are ascribable to that upper marginal portion of the oblique pencil. Use of the obstructing member 27, therefore, can improve the optical performance of such systems.

Also, video cameras with their own photographic lenses generally exhibit lower amounts of light in the marginal portions of the area of their frames than in their central portions. This constitutes the so-called "shading" phenomena. Video cameras compensate for this by electrically increasing the magnitude of the output signal for the amounts of light in the marginal zone.

Therefore, replacement of the small format lens of a video camera by a large format photographic lens results in increasing the light amount in the marginal zone of the picture frame, so that the shading compensation becomes excessive. In some cases, the unbalance of the light intensity over the entire area of the picture frame poses a serious problem.

According to the invention, an appropriate upper marginal portion of the oblique pencil $w_1$ is obstructed to positively lower the amounts of marginal light. This makes it possible to establish a good balance of light over the entire area of the picture frame.

The aperture of the light obstructing member 27 is preferably rectangular. However, according to an embodiment of the invention, a round or oval shape arranged to be in proper relation to the effective image frame size is used to achieve the ends of the invention.

According to an embodiment of the invention, the obstructing member 27 is constructed with a variable aperture that varies in accordance with the speed and image angle of the photographic lens used. In the case of a zoom lens, the aperture also varies with focal length variations.

Also, the lens coupling member 22 of the invention may be formed integrally with the outer barrel of the photographic lens, and the diameter of the aperture of the obstructing member may be controlled by a signal from the camera body.

Figure 4:
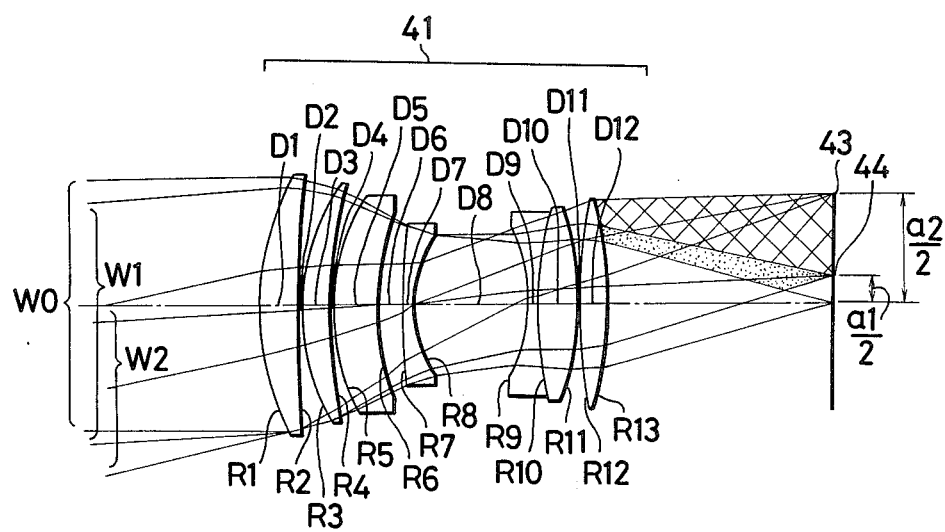
FIG. 4 is a diagram illustrating the optical paths through a large format photographic lens used with a small format camera.

FIG. 4 shows a specific large format photographic lens 41 of pencils of light rays travelling there through to a small format camera 40 with an image plane 42. This lens 41 can be constructed in accordance with the numerical data given below for the radii of curvature R the axial thicknesses and air separations D and the refractive indices N and the Abbe numbers $v$, of the glasses of the element elements with the subscripts numbered consecutively from front to rear, i.e. from object end to image end.

| F = 100 | FNO = 1:2.0 | $2\omega_1 = 6.3$ | $2\omega_2 = 24.4$ |
|---|---|---|---|
| R1 = 56.33 | D1 = 7.29 | N1 = 1.67790 | $v1$ = 55.3 |
| R2 = 319.75 | D2 = 0.79 | | |
| R3 = 42.64 | D3 = 5.33 | N2 = 1.49700 | $v2$ = 81.6 |
| R4 = 86.22 | D4 = 1.09 | | |
| R5 = 43.93 | D5 = 8.86 | N3 = 1.65160 | $v3$ = 58.7 |
| R6 = 49.16 | D6 = 5.35 | | |
| R7 = 137.49 | D7 = 1.80 | N4 = 1.75520 | $v4$ = 27.5 |
| R8 = 23.84 | D8 = 23.32 | | |
| R9 = 34.27 | D9 = 2.10 | N5 = 1.63980 | $v5$ = 34.5 |
| R10 = 84.44 | D10 = 8.20 | N6 = 1.69680 | $v6$ = 55.5 |
| R11 = 49.43 | D11 = 0.28 | | |
| R12 = 132.73 | D12 = 5.18 | N7 = 1.71740 | 7 = 29.5 |
| R13 = 78.53 | | | |

In FIG. 4, the extra-axial or off-axis image points for the 2/3 in. image pickup tube and the 35 mm film are indicated at 44 and 43, respectively. The first and second oblique pencils $w_1$ and $w_2$ are transmitted to the points 44 and 43, respectively.

Figure 5:
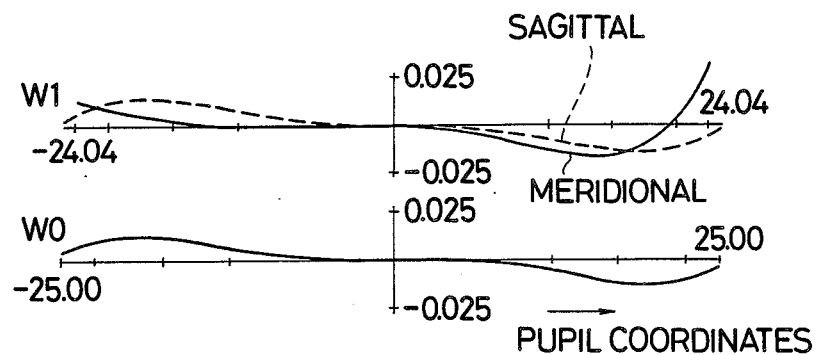
FIG. 5 graphically represents the aberrations of the lens of FIG. 4.

The lateral aberrations of the pencils $w_0$ and $w_1$ of FIG. 4 are shown in FIG. 5.

Figure 6:
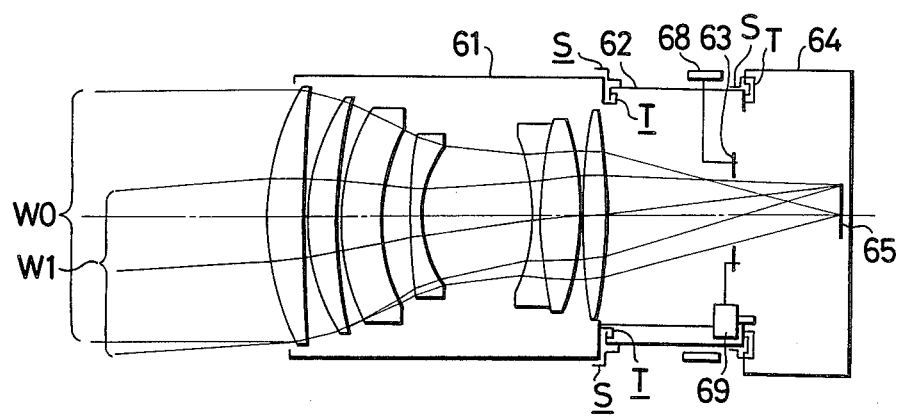
FIG. 6 illustrates the optical paths in a camera system embodying the invention and using a small format camera and the lens of FIG. 4.

The light obstructing member of the invention used with the lens of FIG. 4 limits the pencils of light rays to be transmitted to the image frame as shown in FIG. 6. In this specific embodiment, the light obstructing member 63 is positioned 20 mm from the rear vertex of the lens 61, and has a round aperture 13 mm in diameter. The lens 61 has the same structure as the lens 41. This arrangement does not obstruct the on-axis pencil $w_0$, but a portion of the oblique pencil $w_1$ and any wider angle pencil are obstructed.

Figure 7:
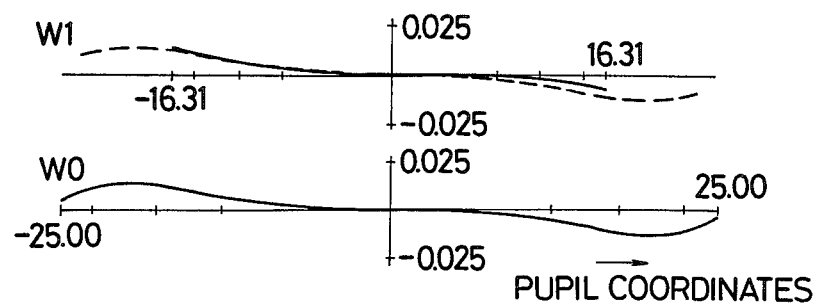
FIG. 7 are graphic representations of the aberrations in the camera of FIG. 6.

The lateral aberrations of the on-axis pencil $w_0$ and the oblique pencil $w_1$ of FIG. 6 are shown in FIG. 7.

As is obvious from FIG. 7, the use of the lens coupling member of the invention provides a significant improvement of the lateral aberration over that of FIG. 5.

According to one embodiment of the invention, the obstructing member 27 of FIG. 2 is constructed, and its aperture is controlled, in the same manner as a lens diaphragm. For this purpose, a manually adjustable ring 28 is placed about the coupling member 22. A photographer can then adjust the aperture of the obstruction on the basis of the speed, image, angle, and, if necessary, the focal length variations of the lens 21. For automatic adjustment, the coupling member 22 contains an electromagnetic arrangement 29 that responds to signals from the camera body 23 and lens 21 to control the aperture of the obstruction 27 on the basis of lens speed, image angle, and, for use with a zoom lens, the focal length variations of the lens.

A similar ring 68 and electromagnetic arrangement 69 are used in the coupler of FIG. 6.

According to another embodiment of the invention, the obstructing member 27 of FIG. 2, or 63 of FIG. 6, may be an LCD type whose shape and size can be electronically controlled. In that case the arrangements 29 and 69 are electronic.

The coupling members 12, 22 and 62 each include a circumferential frame or shell S and thread or bayonet facilities T at each axial surface to secure the members to the camera body and the lens.

According to an embodiment of the invention the apertures 27 and 67 at their smallest dimension are smaller than the lens element closest to the camera and less than half the outer diameter of the shell.

While embodiments of the invention have been described in detail, it will be evident to those skilled in the art that the invention may be embodied otherwise without departing from its spirit and scope.

What is claimed is:

1. An optical assembly co-operative with a camera body having a small format image plane, comprising:
    large format objective lens means for imaging on said image plane;
    a tube connected with said objective lens means and having connecting means for connection with said camera body; and
    an aperture stop arranged on the image side of said objective lens means, for shielding off-axial rays toward the outside of said image plane without shielding on-axial rays of said objective lens means.

2. An optical assembly according to claim 1, wherein said aperture stop shields part of the off-axial rays directed toward a margin of said image plane.

3. An optical assembly according to claim 1, wherein said aperture stop has a variable aperture size.

4. An optical assembly according to claim 1, wherein said aperture stop is held by said tube.

5. An optical assembly according to claim 1, wherein said objective lens means is contained in a lens barrel, and said tube has another connection means for connection with said lens barrel.

6. A tube for connecting a camera body having a small format image plane to a photographic lens apparatus which images on said image plane, comprising:
    an aperture stop for shielding off-axial rays directed toward the margin of said image plane without shielding on-axial rays of said photographic lens apparatus.

7. A tube according to claim 6, wherein said aperture stop shields part of the off-axial rays directed toward a margin of said image plane.

8. A tube according to claim 6, wherein said aperture stop has a variable aperture size.

* * * * *